United States Patent [19]

Chandalia et al.

[11] 4,181,781

[45] Jan. 1, 1980

[54] IN-SITU POLYVINYL GRAFTING OF POLYURETHANES

[75] Inventors: Kiran B. Chandalia, Cheshire; Frank J. Preston, Meriden; Henry G. Barnowski, Durham, all of Conn.

[73] Assignee: Olin Corporation, New Haven, Conn.

[21] Appl. No.: 910,414

[22] Filed: May 30, 1978

[51] Int. Cl.² .................... C08G 18/63; C08G 18/14; C08G 18/16
[52] U.S. Cl. .................................. 521/137; 521/167; 521/172; 528/75; 528/80; 525/63
[58] Field of Search .................. 521/167, 137, 172; 528/75, 80

[56] References Cited

U.S. PATENT DOCUMENTS

| | | | |
|---|---|---|---|
| 3,383,351 | 5/1968 | Stamberger | 260/33.2 |
| 3,752,803 | 8/1973 | Sheppard et al. | 260/192 |
| 3,823,201 | 7/1974 | Pizzini et al. | 260/861 |
| 4,094,868 | 6/1978 | Chandalia et al. | 521/137 |
| 4,125,487 | 11/1978 | Olstowski | 521/137 |

*Primary Examiner*—H. S. Cockeram
*Attorney, Agent, or Firm*—Robert J. Feltovic; Thomas P. O'Day

[57] ABSTRACT

Disclosed is a process for preparing polyurethane which comprises including an azo or peroxy di-ester polyol and an ethylenically unsaturated monomer in a polyurethane reaction formulation to effect simultaneous graft copolymerization and polyurethane polymerization. Novel polyurethane compositions are produced.

17 Claims, No Drawings

IN-SITU POLYVINYL GRAFTING OF POLYURETHANES

Polyurethane foams commonly are prepared from reaction mixtures including polyols, isocyanate catalysts and blowing agents. In order to enhance such foam properties as load bearing capacity and resiliency, various methods have been developed to effect an increase in the overall molecular weight of the polyol reaction component without seriously affecting its chain length. One known approach is to form graft copolymer dispersions from vinyl monomers and polyols and then to use these dispersions in the formation of urethane polymers. For example, U.S. Pat. No. 3,383,351 to Stamberger teaches that ethylenically unsaturated monomers may be polymerized in a polyol medium. As evidenced by Pizzini et al in U.S. Pat. No. 3,823,201, graft copolymers could also be formed by reacting vinyl monomers in polyols containing some degree of unsaturation. An effective amount of free radical catalyst is required in order to initiate these copolymerization reactions. Such free radical-type vinyl polymerization catalysts are, for example, the peroxides, persulfates, perborates, azo compounds, etc.

It is also known in the art to prepare graft copolymers by treating polymerizable vinyl-type monomers with azo-containing polymers. This is illustrated in U.S. Pat. No. 3,752,802 to Sheppard et al, which shows (see Example X) the preparation of such azo compounds by reaction of an azo-bis diacid chloride, such as trans-4,4'-azo-bis-(4-cyanovaleryl chloride), with a monohydroxyl-terminated polyether. The prepared azo-containing polymers are reacted with suitable vinyl monomers under conditions where the azo-carbon linkage is decomposed into free radicals at a rate and temperature suitable for polymerizing the vinyl monomer.

Copending, commonly assigned, U.S. patent applications Ser. Nos. 779,968 and 780,213 (now U.S. Pat. No. 4,094,868) are directed to novel azo di-ester polyols and graft copolymers made therefrom by reaction with an unsaturated monomer. These graft copolymers are then used in formulations for the preparation of polyurethane compositions.

Another set of copending, commonly assigned, U.S. patent applications, Ser. Nos. 843,103 and 843,104, describe novel peroxy di-ester polyols, vinyl graft copolymers made therefrom, and polyurethane composition utility.

Now, an improved, in-situ polyvinyl graft copolymerization-polyurethane formation process has been developed. This process, according to the present invention, comprises conducting polyvinyl grafting copolymerization simultaneously with polyurethane polymerization. The simultaneous co-reaction is accomplished by incorporating an azo di-ester polyol and/or a peroxy di-ester polyol component and reactive ethylenically unsaturated monomers into a conventional polyurethane forming reaction mixture. The reactions that occur involve graft copolymerization of the vinyl monomers and the azo or peroxy di-ester polyols, polyurethane formation by reaction of a conventional polyol component with isocyanate, as well as polyurethane formation through reaction of the di-ester polyols and the graft copolymers with isocyanate.

The invented in-situ polyvinyl grafting-polyurethane formation process offers several unique advantages. Since the polyurethane formation reaction is exothermic, this heat of reaction can be utilized to promote the polyvinyl grafting reaction, thus eliminating the need for external energy application. Further, the nitrogen released when utilizing the embodiment involving the azo di-ester/polyvinyl grafting reaction can be used to perform part or all of the blowing action required in foam formation. This translates into reduced requirements for water, isocyanate, and additional auxiliary blowing agents. Accordingly, the co-reactions are not only compatible but are chemically symbiotic. The in-situ co-reactions result in an improved polyurethane composition.

The azo di-ester polyol compounds which are employed in the invented process can be represented by the general formula:

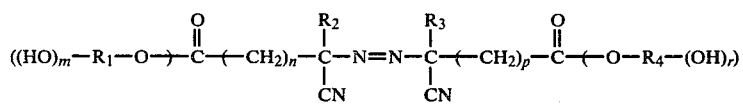

wherein:
m and r independently are integers from 1 to 5;
$R_2$ and $R_3$ independently are alkyl of 1 to 4 carbons;
n and p independently are integers from 0–5; and
the groups $((HO)_m-R_1-O-)$ and $(-O-R_4-(OH)_r)$ independently are residues of polyols, $R_1(OH)_{m+1}$ and $R_4(OH)_{r+1}$, wherein $R_1$ and $R_4$ independently represent polyether or polyester chains, after removal of one hydroxy hydrogen therefrom.

The azo di-ester polyols of the above formula include both symmetrical and non-symmetrical azo di-ester polyol compounds. Symmetrical azo-bis ester polyols can be prepared by reacting an azo-bis diacid with a polyol. Unsymmetrical azo di-ester polyols also can readily be formulated by reacting an unsymmetrical azo diacid with a polyol or a mixture of polyols or by reacting an azo-bis diacid with a mixture of polyols. The symmetrical azo di-ester polyols, hereinafter referred to as azo-bis ester polyols, are preferred. The azo-bis ester polyols used in the present invention can be represented by the general formula:

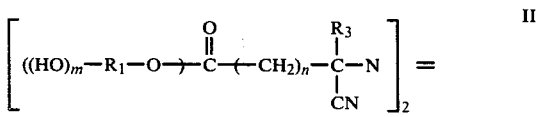

wherein:
m, n, $R_3$ and $((HO)_m-R_1-O-)$ are as defined above.
Particularly preferred are azo-bis ester polyols of the formula:

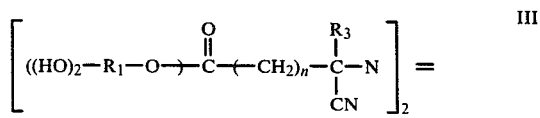

wherein:
n is 0 to 2;

$R_3$ is alkyl of 1 to 3 carbons; and $((HO)_2-R_1-O+)$ is the residue of a polyether triol after removal of one hydroxy hydrogen therefrom.

These types of azo di-ester polyols and their preparation are more fully described in copending, commonly assigned, U.S. patent application Ser. No. 780,213, (now U.S. Pat. No. 4,094,868) which hereby is incorporated by reference in its entirety.

The peroxy di-ester polyols which can be used in the present process can be represented by the general formula:

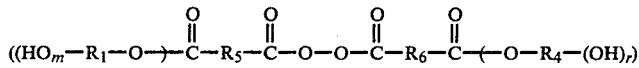

wherein:

m and r independently are integers from 1 to 5;

$R_5$ and $R_6$ independently represent radicals selected from aryl and alkenyl having 2 to 5 carbon atoms; and groups $((HO)_m-R_1-O+)$ and $(+O-R_4-(OH)_r)$ independently are residues of polyols, wherein $R_1$ and $R_4$ are independently selected from polyether or polyester chains, after removal of one hydroxy hydrogen therefrom.

These peroxy compounds can be prepared by a single-step esterification method comprising direct esterification of peroxy diacids with polyols, in the presence of a strong mineral acid.

The peroxy di-ester polyols of the above formula include both symmetrical and non-symmetrical peroxy di-ester polyol compounds. Symmetrical peroxy-bis ester polyols can be prepared by reacting a peroxy-bis diacid with a polyol. Unsymmetrical peroxy di-ester polyols also can readily be formulated by reacting an unsymmetrical peroxy diacid with a polyol or a mixture of polyols or by reacting a peroxy-bis diacid with a mixture of polyols. The symmetrical "peroxy di-ester polyols", hereinafter referred to as peroxy-bis ester polyols, are preferred. The peroxy-bis ester polyols of the present invention can be represented by the general formula:

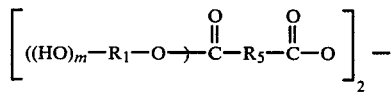

wherein:

m, $R_5$, and $((HO)_m-R_1-O+)$ are as defined above.

Particularly preferred are peroxy-bis ester polyols of the formula:

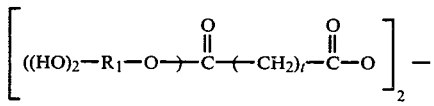

wherein:

t is 2 to 4; and $((HO)_2-R_1-O+)$ is the residue of a polyether triol after removal of one hydroxy hydrogen therefrom.

These peroxy di-ester polyols and their preparation are more fully described in copending, commonly assigned, U.S. patent application Ser. No. 843,103, which is hereby incorporated by reference in its entirety.

The conventional polyol reactant, used in the polyurethane reaction mixture of the present invention, which also is used in preparing the azo and peroxy di-ester polyols, can be any such compound, including mixtures of two or more such compounds, having 2–6 hydroxyl groups and preferably an average equivalent weight from about 250 to about 5000. This includes polyester polyols and polyether polyols. However, the polyether polyols are generally preferred.

The polyester polyols include the products of reacting polycarboxylic acids with polyhydric alcohols. Illustrative polycarboxylic acids include, for example, oxalic, malonic, succinic, glutaric, adipic, pimelic, suberic, azelaic acid and the like. Illustrative polyhydric alcohols include various diols, triols, tetrols and higher-functionality alcohols, such as ethylene glycol, 1,3-propylene glycol, 1,2-propylene glycol, butylene glycols, butane diols, pentane diols, glycerol, trimethylolpropane, trimethylolhexane, pentaerythritol, sorbitol, hexane 1,2,6-triol, 2-methyl glucoside, mixtures thereof and the like. Aromatic type polyols such as Bisphenyl A may also be used.

The polyether polyols, the use of which is preferred herein, include various polyoxyalkylene polyols and mixtures thereof. These can be prepared, according to well-known methods, by condensing an alkylene oxide, or a mixture of alkylene oxides using random or stepwise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiators used in preparing the polyether polyol reactant can be any such material which has from 2 to 6 active hydrogens. This includes (a) aliphatic diols such as ethylene glycol, 1,3-propylene glycol, 1,2-propylene glycol, butylene glycols, butane diols, pentane diols, and the like, (b) the aliphatic triols such as glycerol, trimethylolpropane, triethylolpropane, trimethylolhexane, and the like, (c) higher-functionality alcohols such as sorbitol, pentaerythritol, methyl glucoside, and the like, (d) the polyamines such as tetraethylene diamine and (3) the alkanolamines such as diethanolamine, triethanolamine and the like.

A preferred group of polyhydric initiators for use in preparing the polyether polyol reactant is one which comprises aliphatic triols such as glycerol, trimethylolpropane and the like.

The alkylene oxide-polyhydric initiator condensation reaction is preferably carried out in the presence of a catalyst such as KOH as is well known in the art. In effecting the reaction, a sufficient proportion of alkylene oxide is used as to provide a final polyol product having an average equivalent weight of about 250–5000, preferably about 700–3000 and more preferably about 1000–1500. The catalyst is thereafter preferably removed, leaving a polyether polyol which is ready for use.

Representative ethylenically unsaturated monomers which may be employed in the present invention include butadiene, isoprene, 1,4-pentadiene, 1,6-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexylacrylate, phenyl acrylate, phenyl methacrylate, α-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc. such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis (β-chloroethyl) vinyl phosphonate, vinyl phenyl ketone, vinyl ethyl sulfide, vinyl ethyl sulfone, N-methyl-N-vinyl acetamide, N-vinyl pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumerate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

Preferred monomers include styrene, acrylonitrile, vinyl chloride, methyl methacrylate, hydroxy ethyl acrylate, butadiene, isoprene, chloroprene, and the like. Styrene and acrylonitrile are particularly preferred.

The described invention is of utility in the preparation of any polyurethanes, including elastomers as well as flexible, self-skinning, semi-flexible, and rigid foams, depending on the reaction mixture of formulation. The azo-di-ester polyol embodiment is of particular utility where some blowing is desirable, or at least tolerable. The preparation of foams according to the invention is preferred. Flexible foam preparations are particularly preferred. Both free-rise foam and hot-molded foam preparations are described in more detail below. In the preferred foam utility, any combination of di-ester polyol, vinyl monomer, conventional polyol, organic polyisocyanate, foaming agent, catalyst, and other reactants capable of forming a polyurethane foam forming reaction mixture can be employed.

The organic polyisocyanates used in the polyurethane foams of this invention include toluene diisocyanate, such as the 80:20 or the 65:35 isomer mixture of the 2,4- and 2,6-isomeric forms, ethylene diisocyanate, propylene diisocyanate, methylenebis-(4-phenyl isocyanate), 3,3'-bitoluene-4,4'-diisocyanate, hexamethylene diisocyanate, naphthalene 1,5-diisocyanate, the polymeric isocyanates such as polyphenylene polymethylene isocyanate, and the like, and mixtures thereof. The amount of isocyanate employed in the present process should generally be sufficient to provide at least about 0.7 NCO group per hydroxy group in the reaction system. In practice, polyisocyanate is usually used in a proportion to provide no more than about 1.25 NCO groups per each hydroxy group. A 100 multiple of the ratio of NCO to OH groups in the reaction system is referred to as the "index".

As described above, the gas released from the azo di-ester/polyvinyl grafting reaction serves as an intrinsic blowing agent, but any additional suitable foaming agent, or mixture of foaming agents may also be employed. These include inorganic foaming agents, such as water, and organic foaming agents containing up to 7 carbon atoms such as the halogenated hydrocarbons and the low molecular weight alkanes, alkenes, and ethers. Illustrative organic agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether, diisopropyl ether, mixtures thereof and the like. Water and the low molecular weight polyhalogenated alkanes, such as monofluorotrichloromethane and dichlorodifluoromethane, are preferred. The amount of foaming agent can be varied over a wide range, as is known in the prior art, depending on the density desired in the foam product.

The catalyst employed in preparing the foams of the invention may be any of the catalysts known to be useful for this purpose, including tertiary amines, organometallic salts, and mixtures of an organometallic salt with one or more tertiary amines, the latter being preferred. Typical tertiary amines include, for example, triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark "Niax A-1", methyldicyclohexylamine, N-cyclohexylmorpholine, dimethyldicyclohexylamine, methyldiethanolamine, mixtures of dimethylcyclohexylamine and 2-(3-pentyl)-1-dimethylaminocyclohexane such as may be purchased commercially under the trademark "Polycat", bis(dimethylaminoethylpropylether), mixtures of triethylene diamine and dipropylene glycol such as the 1:2 and 1:4 weight ratio mixtures which may be purchased commercially under the trademarks "Dabco 33LV" and "Dabco 8020", respectively, bis(dimethylaminopropylether), and mixtures of these catalysts. The preferred tertiary amine catalysts are triethylene diamine, mixtures of triethylene diamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The tertiary amine catalyst is used in a proportion of about 0.1–1.5, and preferably about 0.25–0.75, parts per 100 parts by weight of the total polyol which is employed in preparing the foam.

Typical organometallic salts include, for example, the salts of tin, titanium, antimony, aluminum, cobalt, zinc, bismuth, lead and cadmium, the tin salts, i.e., stannic and stannous salts, being preferred. Illustratively such salts include the octoates, dilaurates, diacetate, dioctoates, oleates, and neodeconates of these metals, the octoates being preferred. The organometallic salt catalyst is used in a proportion of about 0–0.5, and preferably about 0.05–0.2, parts per 100 parts by weight of total polyol which is employed in the preparation of the foam.

It is preferred in the preparation of the polyurethane foams of the invention to employ minor amounts of a conventional surfactant in order to further improve the cell structure of the polyurethane foam. Typical of such surfactants are the silicone oils and soaps, and the siloxane-oxyalkylene block copolymers, U.S. Pat. No. 2,834,748 and T. H. Ferrigno, Rigid Plastic Foams (New York: Reinhold Publishing Corp., 1963), pages 34–42, disclose various surfactants which are useful for this purpose. A preferred group of surfactants are the polysiloxanes such as may be purchased under the trademark "Niax L-5303". Generally, up to two parts by weight of the surfactant are employed per 100 parts of total polyol.

As discussed above, the process, according to the present invention, involves several simultaneous co-reactions. The graft copolymerization reaction may be illustrated by the following examples, where n, $R_3$, and $((HO)_m\text{—}R_1\text{—}O)$ are as defined in Formula I above:

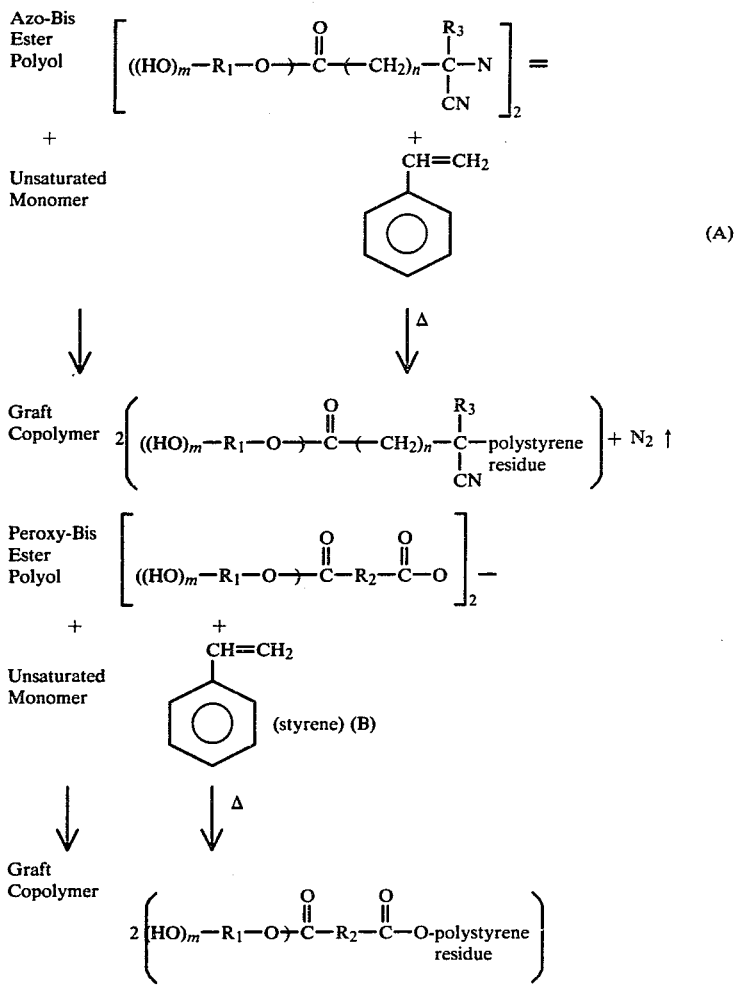

These graft copolymerization reactions are described in more detail in copending, commonly assigned U.S. patent applications Ser. Nos. 779,968 and 843,104, the disclosures of which are hereby incorporated by reference in their entirety.

The amounts of the respective graft copolymerization reactants in the overall polyurethane forming reaction mixture determine the extent of copolymerized product present in the final polyurethane composition. By varying the relative reactant proportions, a range of graft copolymerized products can be formed, which, in turn, can effect various polyurethane properties. The ratio of peroxy or azo di-ester polyol to monomer in the copolymerization reaction can vary widely depending on the amount of copolymer required and the ensuing attendant polyurethane properties desired. Preferably, the di-ester polyol is used in an amount ranging from about 0.5 to about 30.0 percent, most preferably about 1 to about 25 percent, based on the weight of total polyol.

The amount of ethylenically unsaturated monomer used in the reaction preferably ranges from about 1 to 30 percent, and most preferably from about 3 to 25 percent, based on the weight of total polyols.

The need for a free radical catalyst is eliminated by utilizing the peroxy or azo di-ester polyols. When these peroxy or azo-containing polyols are reacted with suitable vinyl monomers under proper conditions, the peroxy or azo-carbon linkages are decomposed into free radicals at a rate suitable for polymerizing the vinyl monomers. Co-reaction and subsequent grafting can take place at the reactive broken linkage site provided on the polyol chain itself resulting in positive grafting of the unsaturated polymers.

The polyurethane forming reactions can be generally exemplified by the following formula:

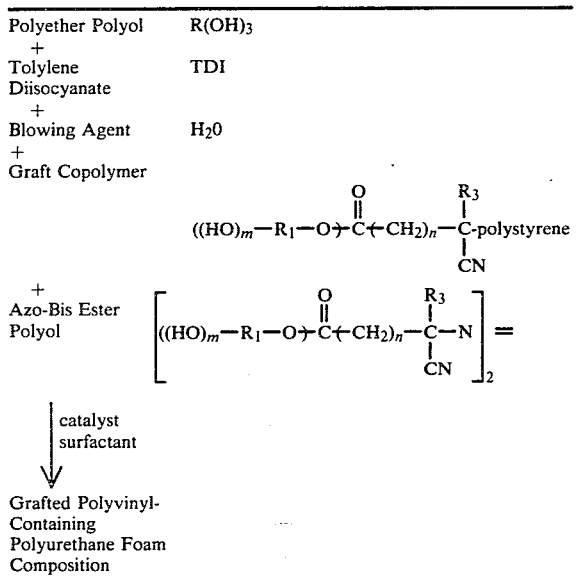

| Polyether Polyol | R(OH)$_3$ |
| --- | --- |
| + | |
| Tolylene Diisocyanate | TDI |
| + | |
| Blowing Agent | H$_2$O |
| + | |
| Graft Copolymer | |

+
Azo-Bis Ester Polyol

| catalyst
| surfactant

Grafted Polyvinyl-Containing Polyurethane Foam Composition

The grafted polyvinyl-containing polyurethane foams prepared according to the method of the present invention exhibit favorable load bearing properties and have surprisingly high air flow characteristics.

The following examples are provided to further illustrate the invention. All parts and percentages are by weight unless otherwise specified.

EXAMPLE I

A hand-mix flexible urethane foam was prepared using standard methods, utilizing, however, the foam, reaction mixture formulation, according to the present invention, set forth in Table 1 below. The ingredients were blended together and then dispensed into a square cardboard box and allowed to foam. Time elapsed was recorded from the moment the mixture was dispensed into the box, and critical foam processing times were noted. "Rise" time is the time elapsed for completion of the foaming or expansion of the foam; "Gel" time is the time elapsed before the resulting foam becomes self-supporting, as evidenced by resistance to puncture by a dull instrument. The gelled foam was cured at 100° C. for 10 minutes. Various tests were performed on the fully cured foam to determine its physical characteristics. These physical properties are listed in Table 2 below. "Compression Deflection" (lbs.) and "Compression Set" are measured according to ASTM D-1564-64T; Sag factor, a measure of the support of cushioning material, is an expression of the ratio of 65% Compression Deflection to 25% Compression Deflection; "Air Flow" (cubic feet per minute) is measured per Nopco Air Picnometer Flow Test; "Tensile", "Tear", and "Elongation" all are determined according to ASTM 1564-64; Density is reported in pounds per cubic foot per ASTM 1564-64.

EXAMPLE II

A hand-mix foam was prepared, according to the present invention, as generally outlined in Example I, using the formulation reported in Table 1 below. Physical properties are listed in Table 2.

COMPARATIVE EXAMPLE III

A comparative polyurethane reaction mixture (C-III) was prepared with the formulation indicated in Table 1 below. This formulation was foamed in the manner outlined in Example I. The resulting foam physicals are reported in Table 2. Comparative Example III uses a formulation without any di-ester polyol or vinyl minomer reaction components.

TABLE 1

| Hand-Mix Foams (200 gm.) EXAMPLE | I | II | C-III |
| --- | --- | --- | --- |
| Components | (pbw) | (pbw) | (pbw) |
| Polyether Polyol ① | 84 | 84 | 100 |
| Azo Di-Ester Polyol ② | 6 | 6 | — |
| Styrene | 10 | 10 | — |
| DABCO 33LV ③ | 0.3 | 0.3 | 0.3 |
| H$_2$O | 3.0 | 3.0 | 3.0 |
| Surfactant L-520 ④ | 1.5 | 1.5 | 1.5 |
| Stannous Octoate | 0.35 | 0.50 | 0.25 |
| TDI-80 ⑤ | 39.5 | 39.5 | 39.5 |
| Foam Processing | | | |
| Rise (sec.) | 120 | 110 | 90 |
| Gel (sec.) | 160 | 140 | 98 |
| Cure (min.) at 100° C. | 10 | 10 | 10 |

①This is a 3000 molecular weight polyether polyol prepared by random oxyalkylation of a glycerol initiator with a mixture of ethylene oxide and propylene oxide in a ratio of 5:95.
②This azo di-ester polyol was prepared, according to U.S. Pat. Application Ser. No. 780,213, by reacting 4,4'-azo-bis-(4-cyanovaleric acid) with the polyether polyol defined in Note 1, above.
③This is a catalyst available from Air Products, Co. under the trademark "DABCO 33LV". It consists primarily of triethylene diamine (⅓) and dipropylene glycol (⅔).
④This is a polysiloxane surfactant available from Union Carbide Corp. under the trademark "NIAX L-520".
⑤This is a mixture of toluene diisocyanate isomers (80/20 mixture of 2,4/2,6-isomers).

TABLE 2

| Foam Physicals | EXAMPLE | I | II | C-III |
| --- | --- | --- | --- | --- |
| Compression Deflection, | 25% | 0.44 | 0.41 | 0.37 |
| | 65% | 0.79 | 0.73 | 0.69 |
| | Sag Factor | 1.80 | 1.75 | 1.84 |
| Compression set, 75% C(T) | C(T) | 4.78 | 6.80 | 4.56 |
| Tensile Strength, psi | | 11.10 | 17.53 | 15.4 |
| Tear Strength, pli | | 1.63 | 2.07 | 2.07 |
| Density, pcf | | 1.98 | 1.94 | 1.96 |
| Air Flow, cfm | | 6.18 | 5.65 | 2.92 |
| Elongation | | 153 | 277 | 203 |

EXAMPLE IV

A hot molded foam was prepared, using standard hand-mix techniques, employing, however, the reaction mixture formulation, according to the present invention, outlined in Table 3 below. The reaction mixture was poured into a 6"×6"×6" mold preheated to 120° F. Final cure was conducted at 230° F. The processing times listed in Table 3 are defined in Example I. Resulting foam physicals are tabulated in Table 4.

COMPARATIVE EXAMPLE V

A comparative foam was prepared (C-V) using the same general procedure of Example IV, but without the di-ester polyol and vinyl monomer components in the reaction mixture. Formulation and processing data appears in Table 3; foam physicals are reported in Table 4.

TABLE 3

| Hot Mold Foams EXAMPLE | IV | C-V |
|---|---|---|
| Components | (pbw) | (pbw) |
| Polyether Polyol ① | 84 | 100 |
| Azo Di-Ester Polyol ② | 6 | — |
| Styrene | 10 | — |
| DABCO 33LV ③ | 0.35 | 0.35 |
| Surfactant L-520 ④ | 1.0 | 1.0 |
| Stannous Octoate | 0.25 | 0.25 |
| TDI-80, Index ⑤ | 105 | 105 |
| Water | 2.8 | 2.8 |
| Foam Processing | | |
| Gel Time | 10 Min. | 122 Sec. |
| Cure Time at 230° F. | 15 | 6 |

①This is a 3000 molecular weight polyether polyol prepared by random oxyalkylation of a glycerol initiator with a mixture of ethylene oxide and propylene oxide in a ratio of 5:95.
②This azo di-ester polyol was prepared, according to U.S. Pat. Application Ser. No. 780,213, by reacting 4'4'-azo-bis-(4-cyanovaleric acid) with the polyether polyol defined in Note 1, above.
③This is a catalyst available from Air Products, Co under the trademark "DABCO 33LV". It consists primarily of triethylene diamine (⅓) and dipropylene glycol (⅔).
④This is a polysiloxane surfactant available from Union Carbide Corp. under the trademark "NIAX L-520".
⑤This is a mixture of toluene diisocyanate isomers (80/20 mixture of 2,4/2,6-isomers).

TABLE 4

| Foam Physicals EXAMPLE | IV | C-V |
|---|---|---|
| Compression Deflection | | |
| 25% | 0.57 | 0.56 |
| 65% | 1.22 | 1.01 |
| Sag Factor | 2.13 | 1.8 |
| Compression Set, 75% | | |
| C(T) | 3.6 | 3.5 |
| C(D) | 4.7 | 4.7 |
| Tensile, psi | 9.5 | 13 |
| Elongation, % | 102 | 118 |
| Tear, pli | 2.2 | 1.8 |
| Density, pcf | 2.7 | 2.5 |
| Air Flow, cfm | 4.5 | 1.1 |

What is claimed is:

1. In a process for preparing a polyurethane composition from a reaction mixture comprising a polyol reactant and an organic polyisocyanate, the improvement characterized by effecting simultaneous co-reactions of polyvinyl grafting and polyurethane formation by including in said reaction mixture an ethylenically unsaturated monomer or a mixture of such monomers, in an amount ranging from about 1.0 to about 30.0 percent by weight based on the weight of the total polyol in the reaction mixture, together with a di-ester polyol, or a mixture of such di-ester polyols, in an amount ranging from about 0.5 to about 20.0 percent by weight based on the weight of the total polyol in the reaction mixture, said di-ester polyols selected from;

azo di-ester polyols of the formula:

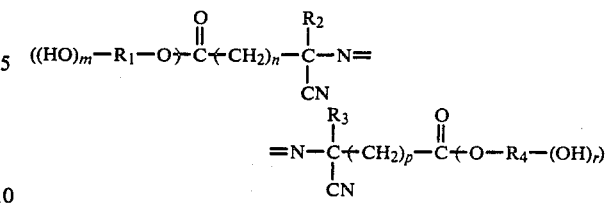

and peroxy di-ester polyols of the formula:

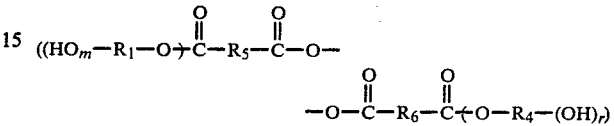

wherein:
m and r independently are integers from 1 to 5;
n and p independently are integers from 0–5;
$R_2$ and $R_3$ independently are alkyl of 1–4 carbons;
$R_5$ and $R_6$ independently are radicals selected from aryl and alkenyl of 2–5 carbons; and
the groups $((HO)_m-R_1-O-)$ and $(-(O-R_4-(OH)_r)$ independently are residues of polyols, $R_1(OH)_{m+1}$ and $R_4(OH)_{r+1}$, wherein $R_1$ and $R_4$ independently represent polyether or polyester chains, after removal of one hydroxy hydrogen therefrom.

2. In a process for preparing a polyurethane foam from a reaction mixture comprising a polyol reactant, an organic polyisocyanate, and a foaming agent, the improvement characterized by effecting simultaneous co-reactions of polyvinyl grafting and polyurethane formation by including in said reaction mixture an ethylenically unsaturated monomer, or a mixture of such monomers, in an amount ranging from about 1.0 to about 30.0 percent by weight based on the weight of the total polyol in the reaction mixture, together with a di-ester polyol, or a mixture of such di-ester polyols, in an amount ranging from about 0.5 to about 20.0 percent by weight based on the weight of the total polyol in the reaction mixture, said di-ester polyols selected from;

azo di-ester polyols of the formula:

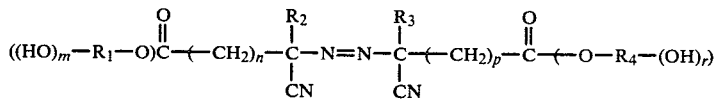

and peroxy di-ester polyols of the formula:

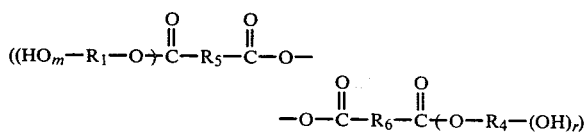

wherein:
m and r independently are integers from 1 to 5;
n and p independently are integers from 0–5;
$R_2$ and $R_3$ independently are alkyl of 1–4 carbons;
$R_5$ and $R_6$ independently are radicals selected from aryl and alkenyl of 2–5 carbons;
and the groups $((HO)_m-R_1-O-)$ and $(-(O-R_4-(OH)_r)$ independently are residues of polyols $R_1(OH)_{m+1}$ and $R_4(OH)_{r+1}$, wherein $R_1$ and $R_4$ independently represent polyether or polyester chains, after removal of one hydroxy hydrogen therefrom.

3. The process of claim 2 wherein the di-ester polyols are bis ester polyols selected from; azo-bis ester polyols of the formula:

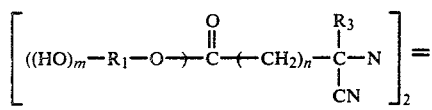

and peroxy-bis ester polyols of the formula:

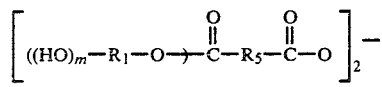

wherein:
m is an integer from 1–5;
n is an integer from 0–5;
$R_3$ is alkyl of 1–4 carbons;
$R_5$ is a radical selected from aryl and alkenyl of 2–5 carbons;
and the group $((HO)_m{-}R_1{-}O{-})$ is a residue of a polyol, $R_1(OH)_{m+1}$, after removal of one hydroxy hydrogen therefrom.

4. The process of claim 3 wherein the bis ester polyols are selected from; azo-bis ester polyols of the formula:

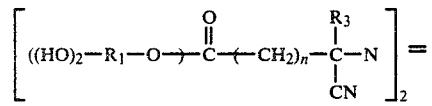

, and peroxy-bis ester polyols of the formula:

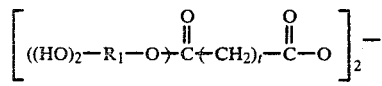

wherein:
n is 0–2;
$R_3$ is alkyl of 1 to 3 carbons;

t is 2–4;
and $((HO)_2{-}R_1{-}O{-})$ is the residue of a polyether triol after removal of one hydroxy hydrogen therefrom.

5. The process of claim 2 wherein the ethylenically unsaturated monomer is selected from styrene, acrylonitrile, vinyl chloride, methyl methacrylate, hydroxy ethyl acrylate, butadiene, isoprene, chloroprene, and mixtures thereof.

6. The process of claim 5 wherein the ethylenically unsaturated monomer is selected from styrene, acrylonitrile, and mixtures thereof.

7. The process of claim 2 wherein the ethylenically unsaturated monomer ranges in an amount from about 1 to about 30 percent, based on the weight of the total polyol in the reaction mixture.

8. The process of claim 7 wherein the ethylenically unsaturated monomer ranges in an amount from about 3 to about 25 percent.

9. The process of claim 2 wherein the di-ester polyol in the reaction mixture ranges in an amount from about 0.5 to about 30.0 percent, based on the weight of total polyol.

10. The process of claim 9 wherein the di-ester polyol ranges in an amount from about 1 to about 25 percent.

11. The process of claim 2 wherein the di-ester polyols are selected from azo di-ester polyols.

12. The process of claim 3 wherein the di-ester polyols are selected from azo-bis ester polyols.

13. The process of claim 4 wherein the di-ester polyols are selected from azo-bis ester polyols.

14. The process of claim 13 wherein ethylenically unsaturated monomer is selected from styrene, acrylonitrile, and mixtures thereof, the azo-bis ester polyol ranges in an amount from about 1 to about 25 percent, based on the weight of total polyol, the unsaturated monomer ranges in an amount from about 3 to about 25 percent, based on the weight of total polyol, and the polyol reactant comprises a polyether triol having an average equivalent weight ranging from about 1000 to 1500.

15. A polyurethane composition prepared according to the process of claim 1.

16. A polyurethane composition prepared according to the process of claim 2.

17. A polyurethane composition prepared according to the process of claim 14.

* * * * *

UNITED STATES PATENT AND TRADEMARK OFFICE
CERTIFICATE OF CORRECTION

PATENT NO. : 4,181,781

DATED : January 1, 1980

INVENTOR(S) : Kiran B. Chandalia, Frank J. Preston and Henry G. Barnowski

It is certified that error appears in the above-identified patent and that said Letters Patent are hereby corrected as shown below:

Column 5, line 59, after "mixture", delete the word "of".

Columns 7 and 8, in the co-reaction of "Graft Copolymer", the formula

" 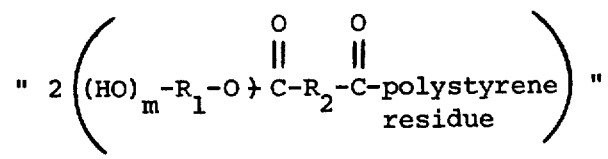 "

should read

-- 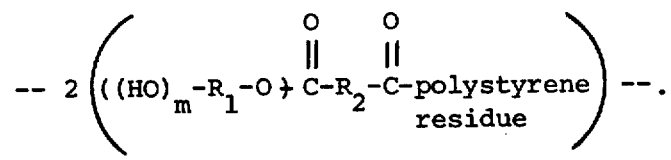 --.

UNITED STATES PATENT AND TRADEMARK OFFICE
CERTIFICATE OF CORRECTION

PATENT NO. : 4,181,781  Page 2 of 5

DATED : January 1, 1980

INVENTOR(S) : Kiran B. Chandalia, Frank J. Preston and Henry G. Barnowski

It is certified that error appears in the above-identified patent and that said Letters Patent are hereby corrected as shown below:

Column 10, lines 47-57

TABLE 2

| Foam Physicals | EXAMPLE | I | II | C-III |
|---|---|---|---|---|
| Compression Deflection, | 25% | 0.44 | 0.41 | 0.37 |
| | 65% | 0.79 | 0.73 | 0.69 |
| | Sag Factor | 1.80 | 1.75 | 1.84 |
| Compression set, 75% C(T) | C(T) | 4.78 | 6.80 | 4.56 |
| Tensile Strength, psi | 11.10 | 17.53 | 15.4 | |
| Tear Strength, pli | 1.63 | 2.07 | 2.07 | |
| Density, pcf | 1.98 | 1.94 | 1.96 | |
| Air Flow, cfm | 6.18 | 5.65 | 2.92 | |
| Elongation | 153 | 277 | 203 | | should read

UNITED STATES PATENT AND TRADEMARK OFFICE
CERTIFICATE OF CORRECTION

PATENT NO. : 4,181,781

DATED : January 1, 1980

INVENTOR(S) : Kiran B. Chandalia, Frank J. Preston and Henry G. Barnowski

It is certified that error appears in the above–identified patent and that said Letters Patent are hereby corrected as shown below:

TABLE 2

| Foam Physicals EXAMPLE | I | II | C-III |
|---|---|---|---|
| Compression Deflection, 25% | 0.44 | 0.41 | 0.37 |
| 65% | 0.79 | 0.73 | 0.69 |
| Sag Factor | 1.80 | 1.75 | 1.84 |
| Compression Set, 75% C(T) | 4.78 | 6.80 | 4.56 |
| Tensile Strength, psi | 11.10 | 17.53 | 15.4 |
| Tear Strength, pli | 1.63 | 2.07 | 2.07 |
| Density, pcf | 1.98 | 1.94 | 1.96 |
| Air Flow, cfm | 6.18 | 5.65 | 2.92 |
| Elongation | 153 | 277 | 203 |

UNITED STATES PATENT AND TRADEMARK OFFICE
CERTIFICATE OF CORRECTION

PATENT NO. : 4,181,781

DATED : January 1, 1980

INVENTOR(S) : Kiran B. Chandalia, Frank J. Preston and Henry G. Barnowski

It is certified that error appears in the above-identified patent and that said Letters Patent are hereby corrected as shown below:

Column 12, line 15, claim 1, the formula

"  "

should read

-- 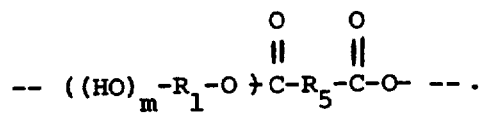 --.

Column 12, line 26, claim 1, "$\}(O-R-$" should read -- $\{O-R_4$ --.

Column 12, line 27, claim 1, "$_4-(OH)_r)$" should read -- $-(OH)_r)$ --.

UNITED STATES PATENT AND TRADEMARK OFFICE
CERTIFICATE OF CORRECTION

PATENT NO. : 4,181,781

DATED : January 1, 1980

INVENTOR(S) : Kiran B. Chandalia, Frank J. Preston and Henry G. Barnowski

It is certified that error appears in the above-identified patent and that said Letters Patent are hereby corrected as shown below:

Column 12, lines 55-57, claim 2, the formula

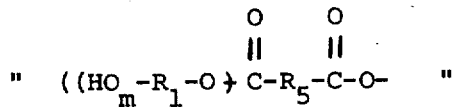

should read

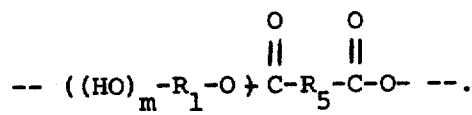

Column 12, line 67, claim 2, "$\{(O-R-$" should read -- $\{O-R_4$ --.

Column 12, line 68, claim 2, "$_4-(OH)_r)$" should read -- $-(OH)_r)$ --.

Column 14, line 31, claim 14, after "wherein", insert the word --the--.

Signed and Sealed this

Twentieth Day of May 1980

[SEAL]

Attest:

SIDNEY A. DIAMOND

Attesting Officer

Commissioner of Patents and Trademarks